US007778428B2

(12) United States Patent
Wu

(10) Patent No.: US 7,778,428 B2
(45) Date of Patent: Aug. 17, 2010

(54) SOUND-SOURCE SIGNAL PROCESSING MODULE

(75) Inventor: Yaz-Tzung Wu, Taipei (TW)

(73) Assignee: Inventec Corporation, Taipei (TW)

( * ) Notice: Subject to any disclaimer, the term of this patent is extended or adjusted under 35 U.S.C. 154(b) by 1204 days.

(21) Appl. No.: 11/364,332

(22) Filed: Mar. 1, 2006

(65) Prior Publication Data

US 2007/0217632 A1 Sep. 20, 2007

(51) Int. Cl.
*H02B 1/00* (2006.01)

(52) U.S. Cl. ........................................ 381/123; 381/81

(58) Field of Classification Search ............ 381/80–81, 381/122–123, 77, 79, 91, 92, 95, 111–115; 700/94; 439/577, 696

See application file for complete search history.

(56) References Cited

U.S. PATENT DOCUMENTS

| | | | | | |
|---|---|---|---|---|---|
| 2,846,514 | A | * | 8/1958 | Byrd | 369/2 |
| 5,910,996 | A | * | 6/1999 | Eggers et al. | 381/107 |
| 6,052,471 | A | * | 4/2000 | Van Ryzin | 381/85 |
| 6,148,085 | A | * | 11/2000 | Jung | 381/104 |
| 7,190,798 | B2 | * | 3/2007 | Yasuhara | 381/86 |
| 2003/0026440 | A1 | * | 2/2003 | Lazzeroni et al. | 381/86 |

* cited by examiner

*Primary Examiner*—Xu Mei
(74) *Attorney, Agent, or Firm*—Muncy, Geissler, Olds & Lowe, PLLC

(57) ABSTRACT

A sound-source signal processing module is provided, wherein a first or a second sound-source signal connection is provided by a receiving port, and the first sound-source signal in a predetermined state is processed by an audio processing module, and the second sound-source signal is enabled to be output from a speaker via an audio processing module, in response to an enable signal of a switch module.

9 Claims, 4 Drawing Sheets

SOUND-SOURCE SIGNAL PROCESSING MODULE

BACKGROUND OF THE INVENTION

1. Field of Invention

The present invention relates to a module capable of switching circuits and particularly to a module capable of switching audio output circuits.

2. Related Art

The so called data processing device of the traditional computer only has the limited functions of word editing, data processing, calculating, and simple picture processing and the like, which cannot meet the demands of the masses sufficiently. As the functions of computer become increasingly stronger, the speed thereof becomes increasingly faster, the price thereof becomes increasingly lower, and the computer becomes more and more popular, more and more corresponding demands of people have emerged. People not only hope to be capable of listening to music and watching movies while typing but also hope to be capable of drawing without pictures, which has even become the current main trend of computer development.

Thanks to the continuous development of technology, since the emergence of the windows operating system, multimedia computer has become the core of the industry development. Till now, under the design trend of thinness, lightness, shortness, and smallness, portable computers have become the requirement of modern people. In order to deal with this trend, the portable computer has been further miniaturized by the computer manufacturers and has become a notebook computer that occupies an area approximately the same as that of a notebook. Although the function of the notebook computer is almost the same as that of a desktop computer, the notebook computer can be put into a portable case or a handbag, which meets the demands of business people who want to use computers everywhere.

In order to increase the operational convenience of the user, general notebook computers at present are all provided with built-in loudspeakers, built-in MICs, and two I/O ports (an earphone for outputting signals and an external MIC for inputting signals). When a user wants to enjoy a multimedia file (for example, DVD (Digital video disc) or VCD (Video Compact Disc) and the like) of a notebook computer or wants to listen to music at a short distance, the audio can be output from the built-in loudspeaker or the external earphone; or when a user wants to input audio data to the notebook computer, the input thereof can be done via the built-in MIC or the external MIC. The basic equipments of a notebook computer, such as the display, the optical disc drive and the loudspeaker, can serve as terminal equipments for playing different types of files (such as video and audio files) when accompanied with the play program loaded in the operating system. However, as understood by users skilled in computer operation, a music optical disc can be easily played with the above basic equipment of a notebook computer when placed in the notebook computer, and this basic equipment can be used as audio devices.

Thanks to science and technology, multimedia science and technology has been generally used in various aspects, such as cellphones and MP3 (MEPG Audio Layer-3) players, which have become quite popular merchandise because of their characteristics of lightness, thinness, and convenient carrying. However, the audio output devices of the above mentioned products are miserable, as they are neglected just because of the pursuit of delicacy and smallness, and this is one of the main reasons of complaints from users. Since the audio output device cannot be improved, it will destroy the audio output quality, and accordingly it is impossible for the user to enjoy a perfect acoustic quality.

For our ears, sound is a vibratory waveform. It causes change in the density of atmospheric pressure through vibrating the air, and the sound is transmitted into the human ears via the air, thus we can hear it. From the point of view of physics, sound can be denoted by pitch, volume, and tone, and is often referred to as an analog signal. While for the computers that can only identify 0 and 1, sound becomes a series of numbers that must be converted from digital signals into analog signals through a conversion procedure, and must be output from a loudspeaker before it can be heard. With the development of the notebook computer, the functions thereof have been almost the same as those of the desktop computer till now. Generally, the sound boxes are designed in the notebook computers, and the acoustic quality of the loudspeakers is good enough to perfectly express the audio signals. Under this conception, the notebook computer is no longer just a word processor stressing portability, but also a portable multimedia center. However, the external output port (MIC) of the present notebook computer is seldom used, and the output function of the MIC is often neglected. As for the conventional technology, when a user wants to enjoy the music of MP3, he/she can only enjoy the music through the earphone that outputting the audio signals. If one wants to play the music via a notebook computer, the file format thereof must be converted through a transmission line, which will occupy a relatively large space of the memory of the notebook computer and will also bring the user a significantly complex procedure in operation. The above problems are just what have to be improved immediately according to the conventional technology.

SUMMARY OF THE INVENTION

In view of this, the object of the present invention is to provide a sound-source signal processing module, which can switch to different output modes according to different sound-source signals, in response to an enable signal of a switch module.

Therefore, in order to achieve the above object, the sound-source signal processing module disclosed in the present invention is applied to the notebook computers. An audio processing module carries out the processing of the first sound-source signal in a predetermined state, and a first or second sound-source signal connection is provided through a receiving port. When an enable signal is sent by a switch module, the operating state of the audio processing module is changed such that the second sound-source signal is output from a speaker directly via the audio processing module. The sound-source signal processing module comprises the audio processing module, the switch module, the receiving port, and the speaker.

The audio processing module has a function of processing the sound-source signals, and it will process the first sound-source signal in the predetermined state.

The switch module, electrically connected to the audio processing module, further comprises a switch. The switch module generates an enable signal through the two-stage operational control of the switch, such that the audio processing module can perform the output selectively.

The receiving port is used to provide a first sound-source signal (for example, an MIC) connection or a second sound-source signal (for example, an audio player and the like) connection.

The speaker, in response to the enable signal sent by the switch module, enables the second sound-source signal to be output from the speaker via the audio processing module.

To sum up, with the sound-source signal processing module disclosed by the present invention, an externally input audio signal can be transmitted to the speaker directly by using the switch of the switch module. Therefore, users are able to change the operating state of the audio processing module by simply switching the originally provided switch. Moreover, the sound-source signal processing module of the present invention is not only convenient for operation, but also need not other additional elements to match with it, thus it is easy to achieve the present invention.

The detailed characteristics and advantage of the present invention are described in detail in the following embodiments, and the content thereof is clear enough for any person skilled in the related art to understand and implement the technology disclosed by the present invention. According to the content disclosed by this specification, the claims and drawings, any person skilled in the related art will easily understand the objects and advantage related to the present invention.

DETAILED DESCRIPTION OF THE INVENTION

In order to make the object, construction, feature, and the function of the present invention further understood, detailed descriptions are made with the embodiments below. The above illustration related to the content of the present invention and the illustration of the following embodiments are used to instruct and explain the principle of the present invention as well as to provide a further explanation of the claims of the present invention.

Figure 1:
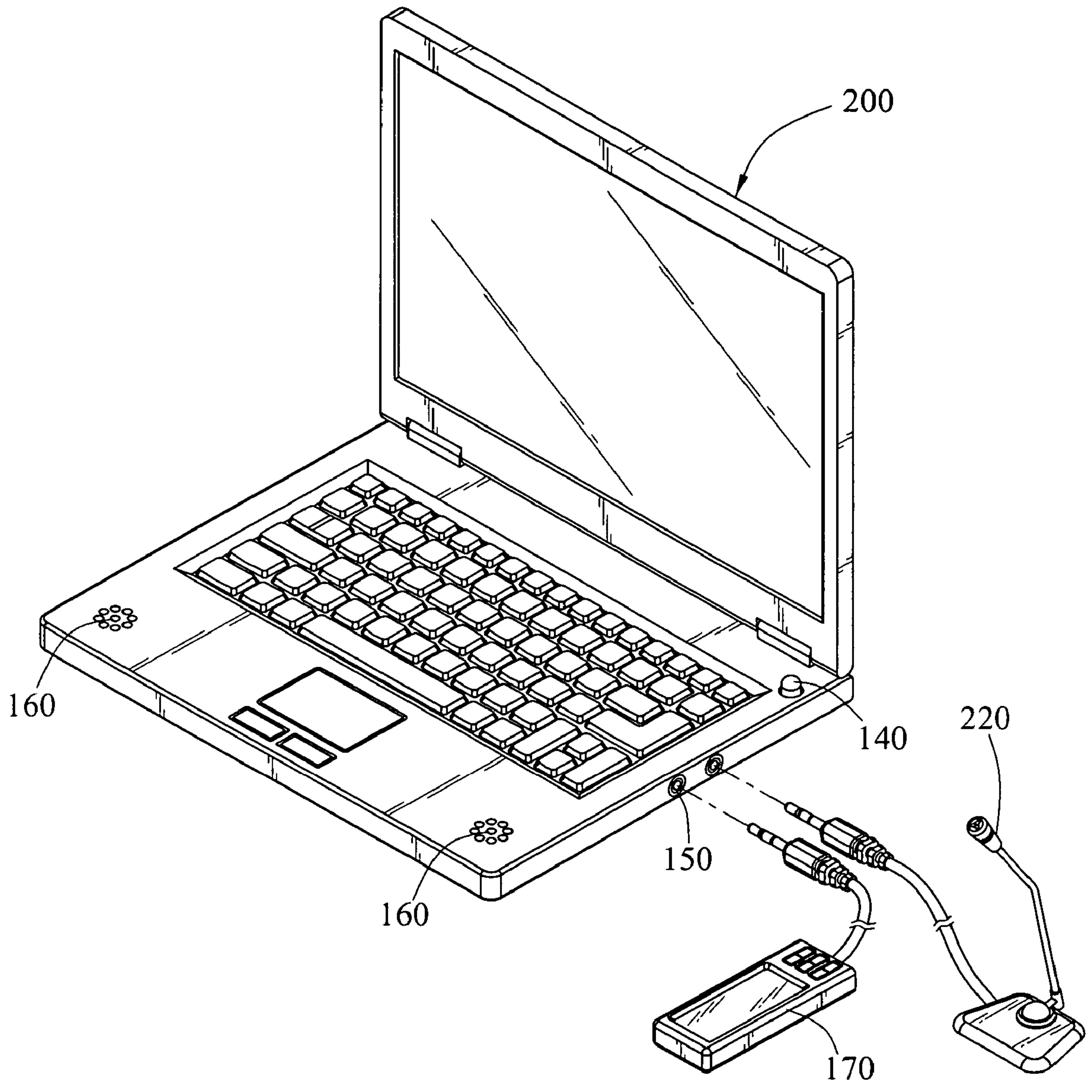
FIG. 1 is a schematic view of an embodiment according to the present invention.

Referring to FIG. 1, the present invention is used for processing a first or a second sound-source signal so as to carry out a play or storage, which uses a switch module 120 to change the output mode of the sound-source signal. And the present invention comprising an audio processing module 110, a switch module 120, a receiving port 150, and a speaker 160 can be applied to a notebook computer 200.

Figure 2:
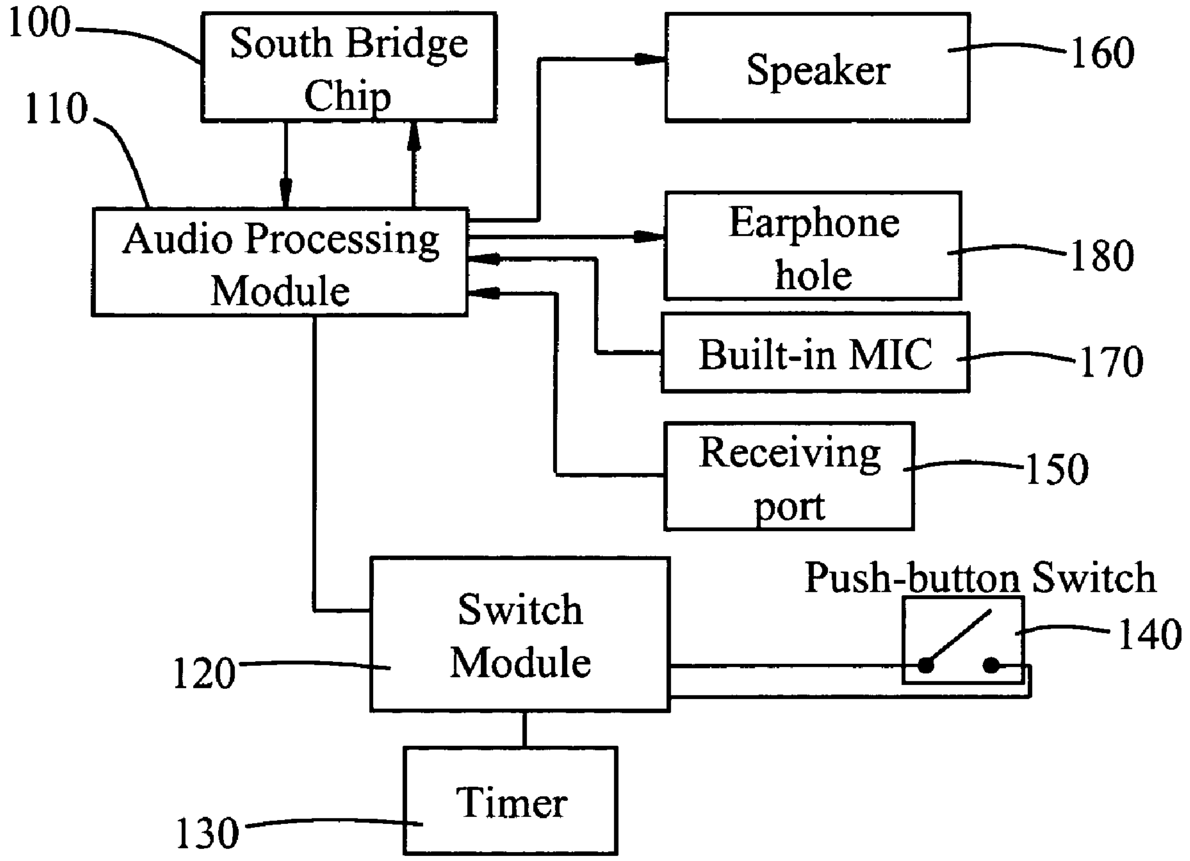
FIG. 2 is a simple block diagram of the present invention.

Referring to FIG. 2, the audio processing module 110 is disposed in the main board, and the sounds of all of the software can be played from the loudspeaker only after being processed by the audio processing module 110, therefore the quality of the audio processing module 110 will influence the quality of the computer audio play indirectly. Just as its name implies, the audio processing module 110 is mainly in charge of the audio processing. Under the control of a south bridge chip 100, a digital sound-source signal in the computer is converted into an analog signal by the audio processing module 110, and then is output from a loudspeaker. Such a predetermined state is namely the flow of a general audio signal processing. Therefore, all of the music we can hear from the computer is played after the conversion of the audio processing module 110. The audio processing module 110 further connects to an earphone hole 180 and built-in MIC 170.

The receiving port 150, which provides a first or a second sound-source signal connection, is typically an external socket having a function of outputting an audio signal. The source of the first sound-source signal is output from a microphone 220 (MIC), and the source of the second sound-source signal may be various kinds of audio players 210 such as MP3 (MEPG Audio Layer-3) player, CD player, and Walkman.

The speaker 160 having a function of outputting an audio signal is a built-in buzzer.

The switch module 120, which is electrically connected to the audio processing module 110, further comprises a push-button switch 140. The push-button switch 140 has a two-stage operational control, wherein the output mode of a sound-source signal can be changed through a long push or a short push, and the push-button switch 140 is monitored by a timer 130. For example, in a predetermined state, under the control of the south bridge chip 100, a digital sound-source signal in the computer is converted into an analog signal by the audio processing module 110. When a user makes a short push on the push-button switch 140 and the push time is shorter than the setting time of the timer 130, an enable signal will be sent in order to change the predetermined state of the audio processing module 110, and the external second sound-source signal is made to be output directly from the built-in buzzer of the notebook computer 200 by being transmitted through the audio processing module 110 to the built-in buzzer. When the user selects to make a long push on the push-button switch 140 and the push time exceeds the setting time of the timer 130, the audio processing module 110 will be recovered to the predetermined state, in response to the enable signal, for continuing the implementation.

Figure 3:
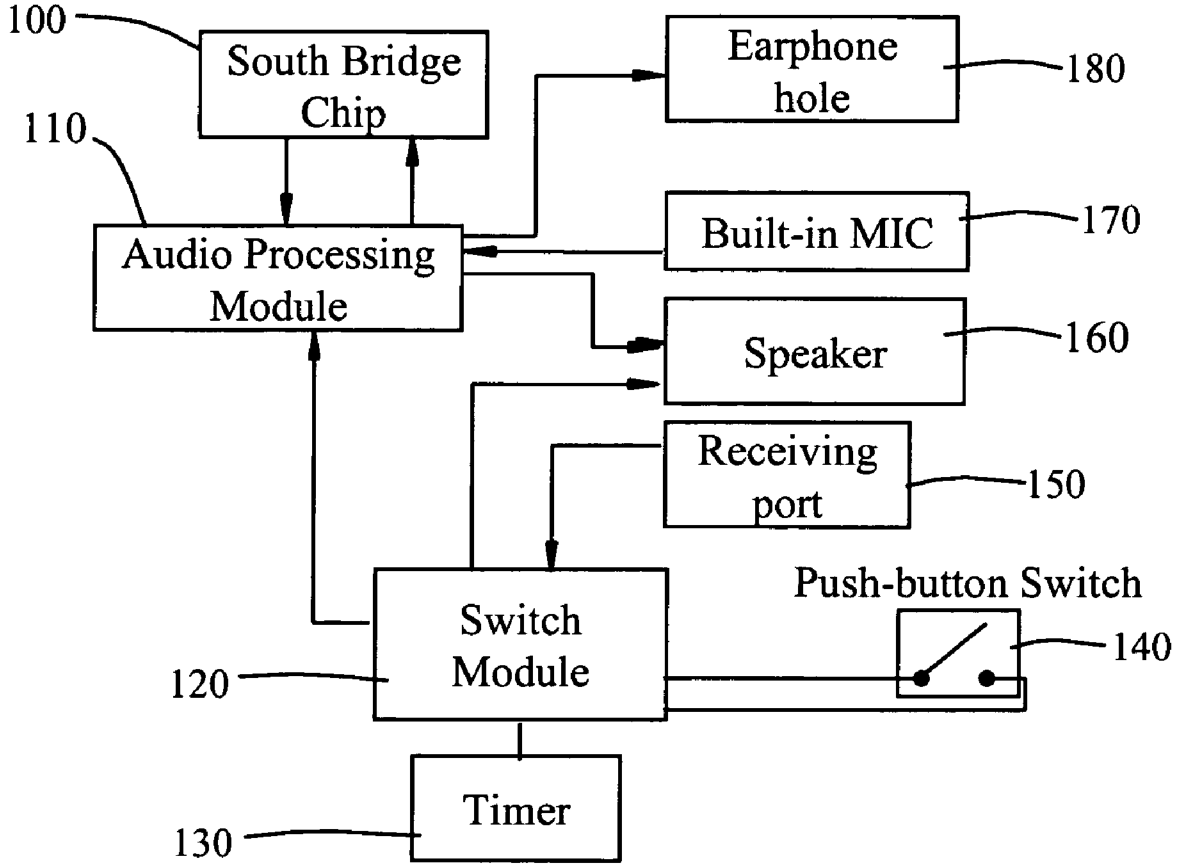
FIG. 3 is a simple block diagram of a second preferred embodiment according to the present invention.

Referring to FIG. 3, it is a second preferred embodiment of the present invention. It should be noted that the members in the second preferred embodiment that are the same as those of the embodiment of FIG. 1 are designated with the same element serial numbers.

Most members of the second preferred embodiment and the operating principles thereof are the same as those of the embodiment of FIG. 1, and what they have in common will not be described again. An electrical loop is arranged by the receiving port 150 via the speaker 160 through the switch module 120; it is switched on by an enable signal of the switch. When the user makes a short push on the push-button switch 140 and the push time is shorter than the setting time of the timer 130, an enable signal will be sent out in order to change the predetermined state, and then the switch module 120 will switch to the electrical loop. Thus, the external second sound-source signal is transmitted to the built-in buzzer of the notebook computer 200 and then output directly therefrom.

Figure 4:
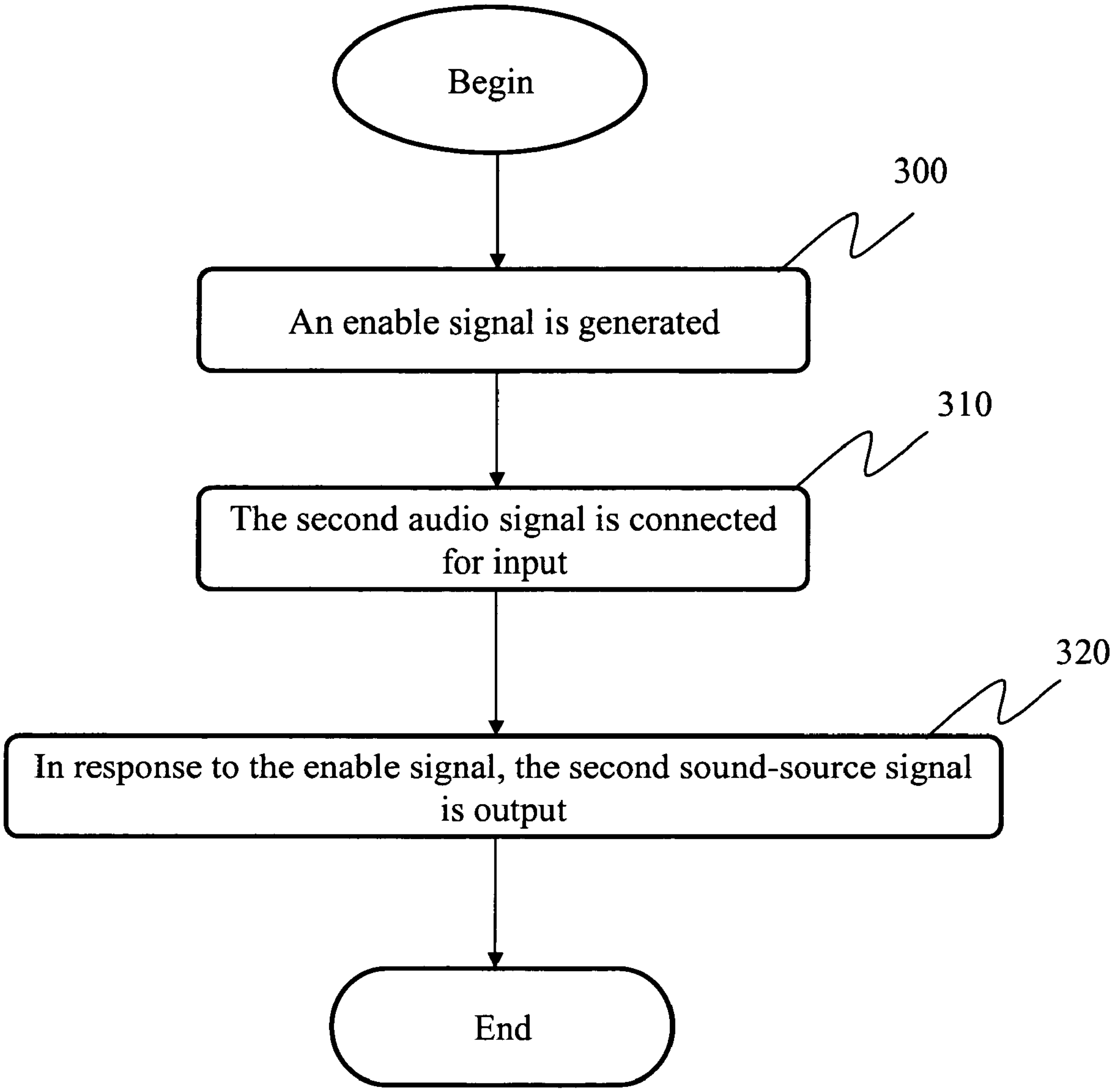
FIG. 4 is a basic flowchart of the sound-source signal processing method according to the present invention.

Referring to FIG. 4, it shows a basic flowchart of the sound-source signal processing method provided in the present invention. The method can be applied to the notebook computer 200 for processing the first or second sound-source signal and for processing the first sound-source signal in the predetermined state.

An enable signal is generated (step 300).

Subsequently, the second audio signal is connected (step 310) for input.

Then, in response to the enable signal, the second sound-source signal is output (step 320).

Additionally, it is notable that the members used in other preferred embodiments are the same as those in the FIG. 1. When the user selects to make a long push on the push-button switch 140 and the push time is longer than the setting time of the timer 130, a “screen protect program” will be activated;

and when the user makes a short push once more or performs shutdown, the original predetermined state will be also recovered.

What is claimed is:

1. A sound-source signal processing module for processing a first sound-source signal to store in a computer or processing a second sound-source signal to a speaker, comprising:

an audio processing module for processing the first or the second sound-source signal and for processing the first sound-source signal in a predetermined state;

a south bridge chip, being electrically connected to the audio processing module, if the audio processing module is in the predetermined state, the south bridge chip stores the first sound-source signal in the computer;

a push-button switch, electrically connected to the audio processing module and generating an enable signal;

a receiving port for providing the first or the second sound-source signal connection;

a speaker, in response to the enable signal, enabling the second sound-source signal to be output from the speaker via the audio processing module; and a timer, for monitoring the push-button switch, when a push time is shorter than a setting time of the timer, the enable signal is generated, when the push time is longer than the setting time of the timer, the audio processing module is recovered to the predetermined state and a screen protect program is activated.

2. The sound-source signal processing module as claimed in claim 1, wherein the source of the first sound-source signal is a microphone (MIC).

3. The sound-source signal processing module as claimed in claim 1, wherein the source of the second sound-source signal is an audio player.

4. The sound-source signal processing module as claimed in claim 1, wherein the switch module has a two-stage operational control.

5. The sound-source signal processing module as claimed in claim 1, wherein the speaker is a built-in buzzer.

6. A sound-source signal processing method for processing a first sound-source signal to store in a computer or processing a second sound-source signal to a speaker, comprising:

determining whether a push time of a push-button switch is shorter or longer than a setting time of a timer;

if the push time is shorter than the setting time, the method comprising:

generating an enable signal;

connecting the second sound-source signal to an audio processing module; and outputting the second sound-source signal to the speaker in response to the enable signal; and if the push time is longer than the setting time, the method comprising:

storing the first sound-source signal in the computer by a south bridge chip; and activating a screen protect program.

7. The sound-source signal processing method as claimed in claim 6, wherein the source of the first sound-source signal is a microphone (MIC).

8. The sound-source signal processing method as claimed in claim 6, wherein the source of the second sound-source signal is an audio player.

9. The sound-source signal processing method as claimed in claim 6, wherein the enable signal is generated by a push-button switch with a two-stage operational control.

* * * * *